United States Patent
Lee

(10) Patent No.: US 12,304,526 B2
(45) Date of Patent: May 20, 2025

(54) METHOD AND APPARATUS FOR CONTROLLING STEERING OF AN AUTONOMOUS VEHICLE FOR DRIVING BETWEEN FLOORS

(71) Applicants: HYUNDAI MOTOR COMPANY, Seoul (KR); KIA CORPORATION, Seoul (KR)

(72) Inventor: Yeong Ho Lee, Pohang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 137 days.

(21) Appl. No.: 18/222,234

(22) Filed: Jul. 14, 2023

(65) Prior Publication Data
US 2024/0217543 A1 Jul. 4, 2024

(30) Foreign Application Priority Data
Dec. 23, 2022 (KR) .......................... 10-2022-0182987

(51) Int. Cl.
*B60W 60/00* (2020.01)
*B60W 40/10* (2012.01)
(Continued)

(52) U.S. Cl.
CPC .......... *B60W 60/001* (2020.02); *B60W 40/10* (2013.01); *B62D 6/001* (2013.01);
(Continued)

(58) Field of Classification Search
CPC .... B60W 60/00; B60W 60/001; B60W 40/10; B62D 6/00; B62D 15/02; B62D 15/021
See application file for complete search history.

(56) References Cited

U.S. PATENT DOCUMENTS

| 2016/0129907 A1* | 5/2016 | Kim ...................... G06V 20/588 |
| | | 701/26 |
| 2022/0041180 A1* | 2/2022 | Choi ........................ G06N 3/08 |
| 2023/0278593 A1* | 9/2023 | Wang .................... B60W 30/06 |
| | | 701/26 |

FOREIGN PATENT DOCUMENTS

| KR | 101273245 B1 | 6/2013 |
| KR | 20220019204 A | 2/2022 |

* cited by examiner

*Primary Examiner* — Tan Q Nguyen
(74) *Attorney, Agent, or Firm* — Lempia Summerfield Katz LLC

(57) ABSTRACT

An apparatus calculates a steering angle of a vehicle and includes: an obstacle-information acquisition unit configured to acquire obstacle information related to an obstacle of an inter-floor connection ramp within an area of interest of the vehicle; a safe-area-direction acquisition unit configured to acquire a front area having a predetermined width in a width direction and a length as long as a length of an area in contact with the obstacle in a longitudinal direction with respect to a center point of a front end of the vehicle, and to acquire a safe area direction vector heading from the center point of the front end towards an end of the front area; a movement-direction acquisition unit configured to determine a movement direction of the vehicle according to the safe area direction vector, the obstacle information, and driving direction information depending on a current steering angle of the vehicle; and a steering-angle calculation unit configured to calculate a target steering angle of the vehicle based on the movement direction and the current steering angle.

11 Claims, 13 Drawing Sheets

(51) Int. Cl.
*B62D 6/00* (2006.01)
*B62D 15/02* (2006.01)
(52) U.S. Cl.
CPC ..... *B62D 15/021* (2013.01); *B60W 2420/403* (2013.01); *B60W 2520/00* (2013.01); *B60W 2554/00* (2020.02)

CONVERSION OF EDGE IMAGE

EXTRACTION OF REPRESENTATIVE POINTS AND
STRAIGHT-LINE INFORMATION OF OBSTACLE

METHOD AND APPARATUS FOR CONTROLLING STEERING OF AN AUTONOMOUS VEHICLE FOR DRIVING BETWEEN FLOORS

CROSS-REFERENCE TO RELATED APPLICATION

The present application claims priority to Patent Application No. 10-2022-0182987, filed on Dec. 23, 2022 in Korea, the entire contents of which are incorporated herein by reference.

TECHNICAL FIELD

The present disclosure relates to a method and an apparatus for controlling steering for inter-floor driving of an autonomous vehicle.

BACKGROUND

The content described in this section merely provides background information on the present embodiment and does not constitute the prior art.

In order to park in a building parking lot, an autonomous vehicle may move around multiple floors in a building to find a parking space.

In a parking lot environment where global positioning system (GPS) reception is difficult, unlike on a road, the autonomous vehicle typically travels depending on a vehicle position and a driving route provided from a server. In this process, the autonomous vehicle may stably receive the driving information of the vehicle from the server while on one floor. However, when moving between floors, the received information may contain many errors because a wall blocks an area around a ramp between floors.

As shown in FIGS. 1A and 1B, when the autonomous vehicle 100 moves between floors, depending on externally received information, a collision with a wall on the left or right side of the ramp may occur while turning within the ramp between the floors.

However, as shown in FIG. 1C, if environment sensor information and current steering input information that the autonomous vehicle has are appropriately utilized in a shadow area where stable information cannot be received from the server, a collision with the wall of the ramp may be avoided while moving between floors.

SUMMARY

In view of the above, the present disclosure provides a steering control apparatus and method for inter-floor driving of an autonomous vehicle.

According to one aspect of the present disclosure, an apparatus for calculating a steering angle for inter-floor travel of an autonomous vehicle is provided. The apparatus includes an obstacle-information acquisition unit configured to acquire obstacle information related to an obstacle of an inter-floor connection ramp within an area of interest of the vehicle. The apparatus also includes a safe-area-direction acquisition unit configured to acquire a front area having a predetermined width in a width direction and a length as long as a length of an area in contact with the obstacle in a longitudinal direction with respect to a center point of a front end of the vehicle. The safe-area acquisition unit is also configured to acquire a safe area direction vector heading from the center point of the front end towards an end of the front area. The apparatus also includes a movement-direction acquisition unit configured to determine a movement direction of the vehicle according to the safe area direction vector, the obstacle information, and driving direction information depending on a current steering angle of the vehicle. The apparatus also includes a steering-angle calculation unit configured to calculate a target steering angle of the vehicle based on the movement direction and the current steering angle.

According to one aspect of the present disclosure, a method of calculating a steering angle for inter-floor travel of an autonomous vehicle is provided. The method includes acquiring obstacle information related to an obstacle of an inter-floor connection ramp within an area of interest of the vehicle. The method also includes acquiring a front area having a predetermined width in a width direction and a length as long as a length of an area in contact with the obstacle in a longitudinal direction with respect to a center point of a front end of the vehicle. The method also includes acquiring a safe area direction vector heading from the center point of the front end towards an end of the front area. The method also includes determining a movement direction of the vehicle according to the safe area direction vector, the obstacle information, and driving direction information depending on a current steering angle of the vehicle. The method also includes calculating a target steering angle of the vehicle based on the movement direction and the current steering angle.

The present disclosure is advantageous in that an error is minimized when an autonomous vehicles is moving between floors of a building by calculating a target steering angle using a previous steering angle value and environment sensor information of the vehicle in a parking lot environment having a shadow area where GPS and external information cannot be received. Thus, it is possible to move in and out between the floors without colliding with a wall in a connecting ramp between the floors.

Further, for the robustness of obstacle detection information, the error of a movement direction vector is minimized by using the Hough transformation technique, which makes it easier to extract multiple pieces of straight line information robustly, even if the lines or curves of a detected image are not completely connected.

DETAILED DESCRIPTION

Figure 1A:
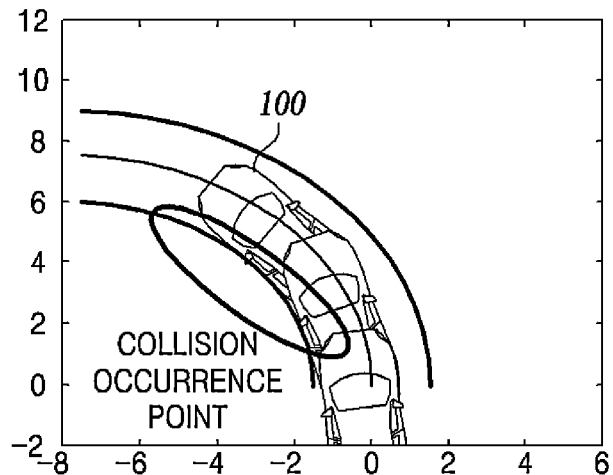
FIGS. 1A-1C are diagrams illustrating a situation in which an autonomous vehicle collides with the wall of a ramp or performs smooth driving according to a steering input when moving between floors.
Figure 1B:
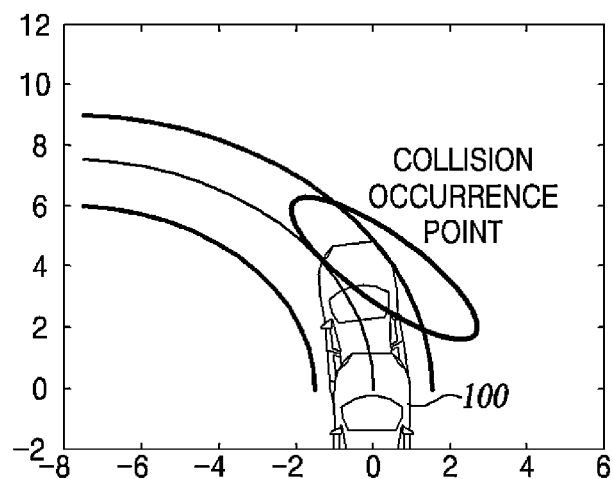
Figure 1C:
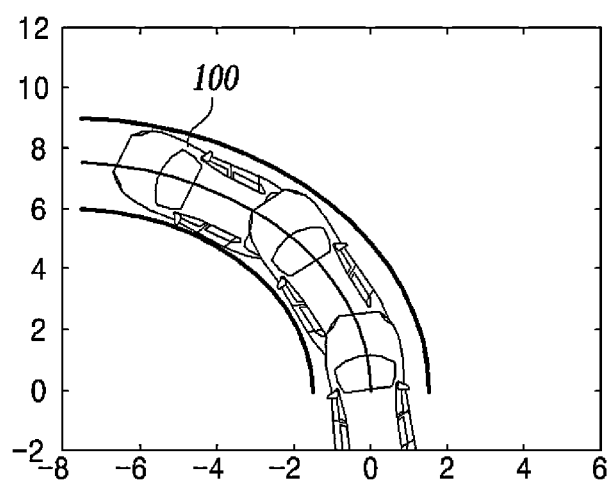

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity. When a component, device, element, unit, or the like of the present disclosure is described as having a purpose or performing an operation, function, or the like, the component, device, element, or unit should be considered herein as being "configured to" meet that purpose or to perform that operation or function. Further, each component, device, element, unit, and the like may separately embody or be included with a processor and a memory, such as a non-transitory computer readable media, as part of the apparatus.

Figure 2:
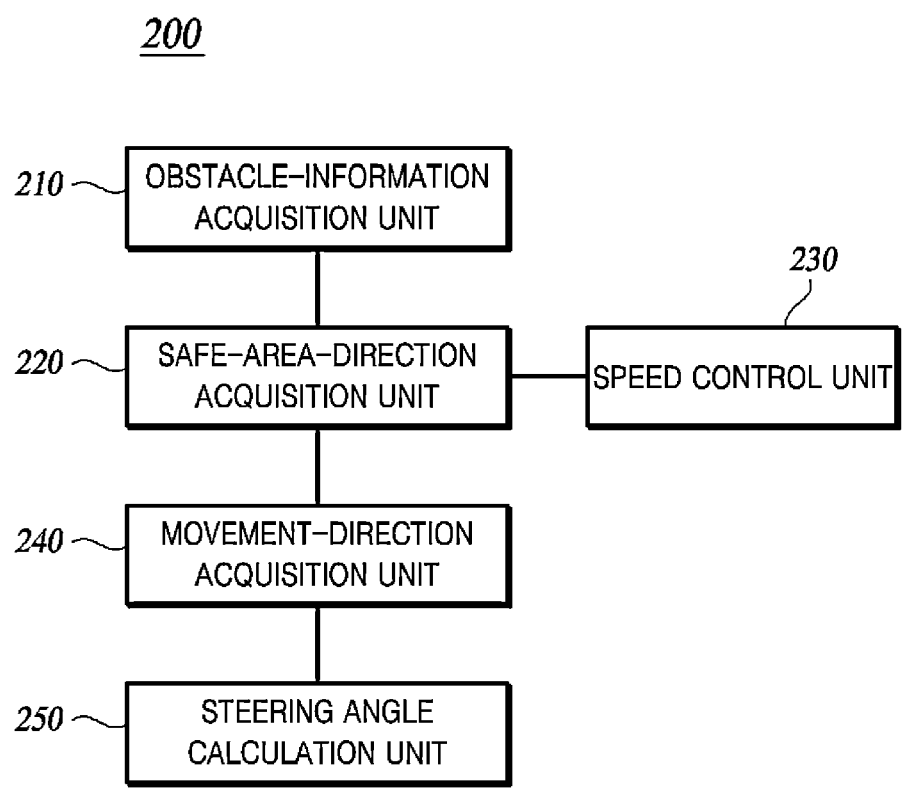
FIG. 2 is an example of a functional block diagram of a steering control apparatus according to the present disclosure.

FIG. 2 is an example of a functional block diagram of a steering control apparatus according to an embodiment.

The steering control device 200 according to this embodiment may include an obstacle-information acquisition unit 210, a safe-area-direction acquisition unit 220, a speed control unit 230, a movement-direction acquisition unit 240, and a steering-angle calculation unit 250.

Figure 3A:
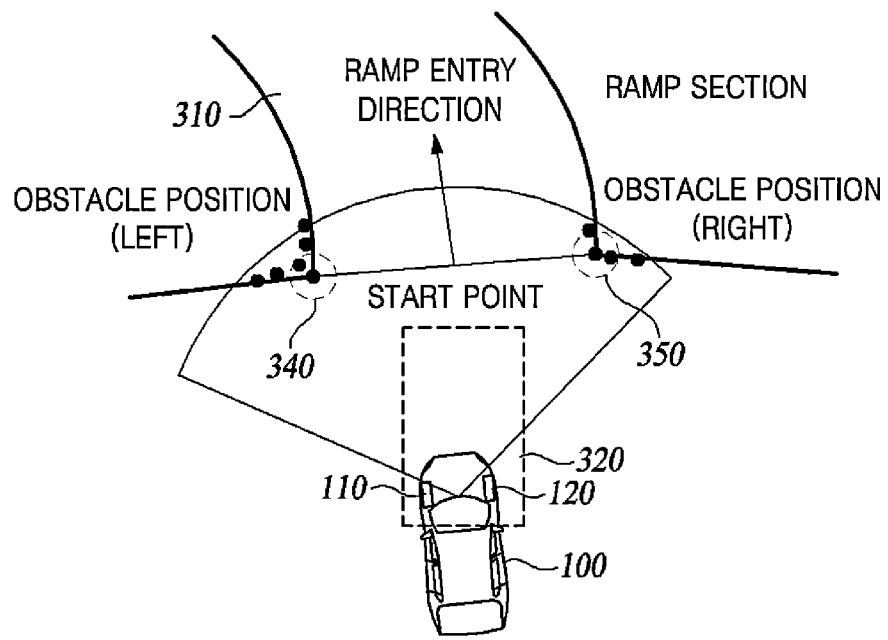
FIG. 3A is a diagram illustrating a vehicle 100 arriving near a ramp entrance to enter a ramp between floors.
Figure 3B:
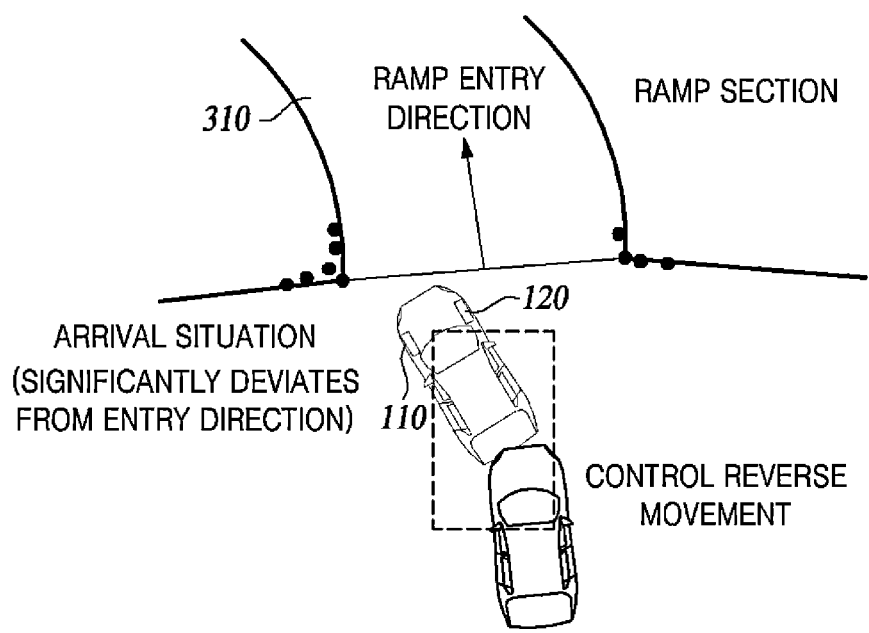
FIG. 3B is a diagram illustrating rearranging the position of the vehicle 100 when arriving at a position where it is difficult to enter the ramp.

FIG. 3A is a diagram illustrating a vehicle 100 arriving near a ramp entrance to enter a ramp between floors. FIG. 3B is a diagram illustrating rearranging the position of the vehicle 100 when arriving at a position where it is difficult to enter the ramp.

The obstacle-information acquisition unit 210 acquires obstacle information related to obstacles of an inter-floor connection ramp 310 within the area of interest of the vehicle.

The obstacle-information acquisition unit 210 acquires obstacle information related to obstacles closest to the vehicle 100 among obstacles on a wall of the inter-floor connection ramp of a building.

Further, the obstacle-information acquisition unit 210 controls such that the vehicle 100 enters the inter-floor ramp of the building in order to acquire obstacle information within the area of interest of the vehicle.

The autonomous vehicle 100 moves to the start point of the ramp according to map information received from a server. When it is determined that the vehicle has arrived at a position in front of the start point of the ramp 310 for moving between floors, the vehicle 100 temporarily stops.

As shown in FIG. 3A, when the vehicle 100 arrives at a position 320 in front of the ramp start point where it may enter the ramp, the obstacle-information acquisition unit 210 starts to extract obstacle information in front of the ramp start point using at least one of a lidar sensor 110 or a camera sensor 120 provided on the vehicle 100. Here, the obstacle information is information related to an obstacle of the ramp and includes curvature information of the wall in a turning direction on the ramp.

The obstacle-information acquisition unit 210 determines whether the driving direction of the vehicle 100 has become a direction in which it may enter the ramp 310 by acquiring left obstacle information and right obstacle information of the entrance to the ramp.

As shown in FIG. 3B, after the vehicle 100 arrives in front of the ramp start point according to the map information received from the server, when it is determined that the vehicle has arrived at a position at which the driving direction of the vehicle 100 deviates greatly from the entry direction of the ramp 310, the obstacle-information acquisition unit 210 aligns the vehicle 100 by controlling the forward and reverse movement of the vehicle 100 so that the vehicle 100 is in an appropriate position to enter the ramp.

Even when the curvature of the turning wall located in the forward direction of the vehicle 100 on the ramp is not properly calculated after the vehicle 100 arrives at a position in front of the ramp start point, the obstacle-information acquisition unit 210 acquires information about the turning wall of the ramp by controlling the forward and reverse movement of the vehicle 100.

The obstacle-information acquisition unit 210 acquires road-width information of the ramp 310 and ramp-entry-direction information based on a point 340 closest to the left obstacle and a point 350 closest to the right obstacle in front of the vehicle 100 using at least one of the lidar sensor 110 or the camera sensor 120. The obstacle-information acquisition unit 210 defines a direction perpendicular to a straight line connecting the two adjacent points 340 and 350 as the ramp entry direction.

Figure 4:
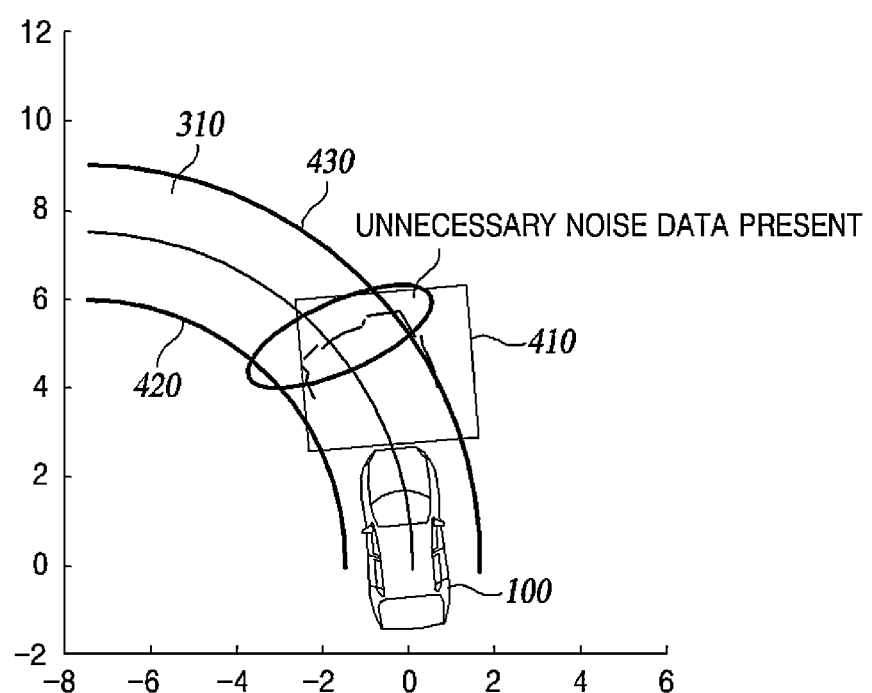
FIG. 4 is a diagram illustrating a situation of extracting an image for an area of interest of the vehicle 100.
Figure 5:
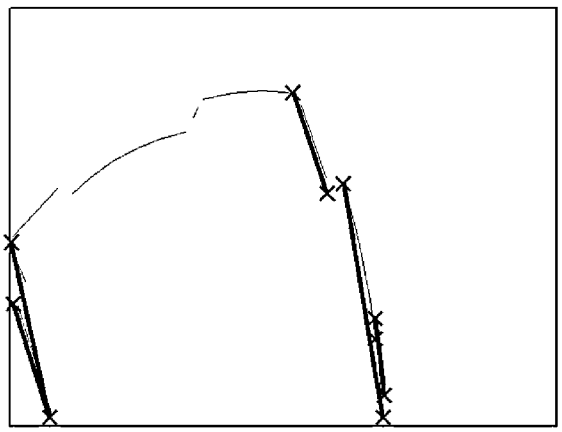
FIG. 5 are diagrams illustrating the result of processing the extracted image through Hough transformation.
Figure 5:
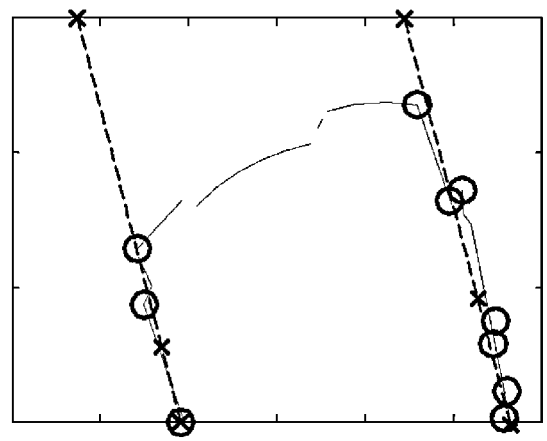

FIG. 4 is a diagram illustrating a situation of extracting an image for the area of interest of the vehicle 100. FIG. 5 is a diagram illustrating the result of processing the extracted image through Hough transformation.

The obstacle-information acquisition unit 210 acquires image data on the area 410 of interest using at least one of the lidar sensor 110 or the camera sensor 120 on the ramp 310.

The straight-line information and representative points of the obstacle (i.e. a left wall 420 and a right wall 430) are extracted by using the information on the left wall 420 and the right wall 430 of the ramp received from the vehicle sensor (at least one of the lidar sensor 110 or the camera sensor 120).

Since the vehicle 100 travels on an inclined surface, unlike a flatland, the image extracted by the installed sensor may contain various pieces of noise information such as information on the floor and ceiling of a path as well as information on the wall of the ramp, depending on the installed position of the sensor. The obstacle-information acquisition unit 210 may remove straight-line information significantly deviating from the driving direction of the vehicle 100 by pre-processing data in order to remove such noise information.

As shown in FIG. 5, the obstacle-information acquisition unit 210 may use the Hough transformation technique in order to detect a straight-line representation in an extracted image. The Hough transformation technique is a representative method among image pre-processing methods.

The Hough transformation extracts edge data from the extracted image. The Hough transformation is suitable for extracting obstacle representative points and representative obstacle straight-line information within the area of interest, because it is easier to robustly extract multiple pieces of linear information even if lines or curves are not completely connected within the image data.

Figure 6:
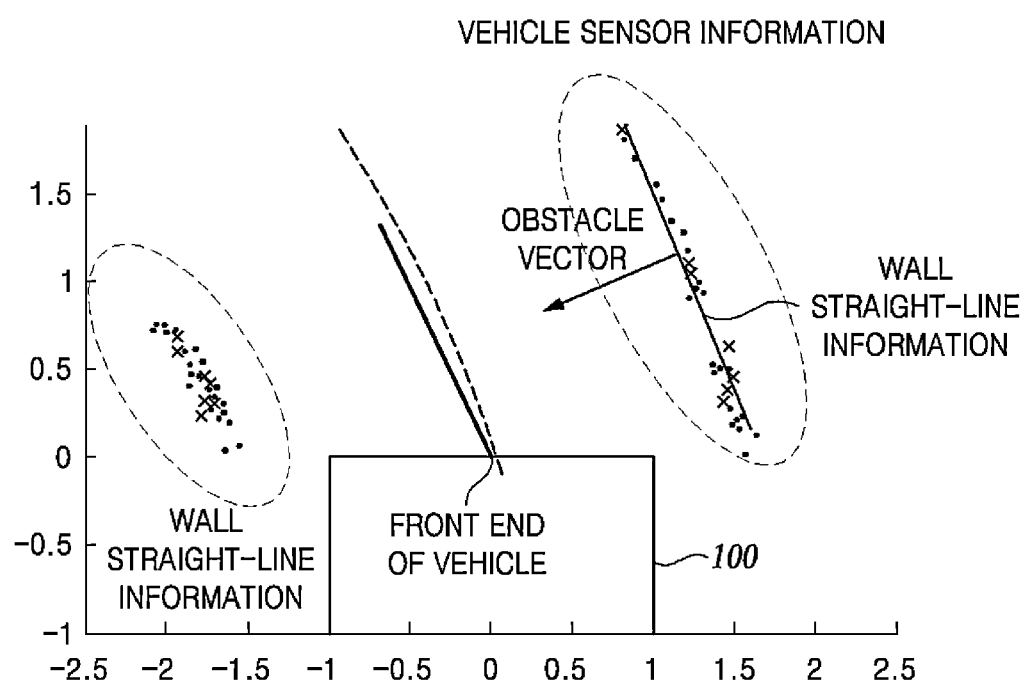
FIG. 6 is a diagram illustrating a straight-line representation and an obstacle vector extracted for the wall of the ramp.

FIG. 6 is a diagram illustrating a straight-line representation and an obstacle vector extracted for the wall of the ramp.

As shown in FIG. 6, the obstacle-information acquisition unit 210 extracts the obstacle vector defined in a direction of force heading towards the vehicle path and perpendicular to the wall of the ramp. In other words, the obstacle-information acquisition unit 210 extracts, as the obstacle vector, the direction perpendicular to the direction of the straight-line representation of the obstacle pre-processed using the Hough transformation. Here, the obstacle vector is a unit vector, and its length is 1.

The obstacle-information acquisition unit 210 extracts the closest obstacle among a plurality of obstacles of the wall of the ramp and generates the obstacle vector perpendicular to the straight-line representation of the closest obstacle as the obstacle information.

The safe-area-direction acquisition unit 220 generates a direction vector for a safe area where a collision with an obstacle does not occur, i.e., a safe-area direction vector, in order to determine the more stable driving direction of the vehicle 100.

The safe-area-direction acquisition unit 220 sets a front area using an elliptical shape and generates the safe-area direction vector in order to determine the movement direction of the vehicle that may stably avoid the obstacle by simplifying the shape of a complex obstacle.

Figure 7A:
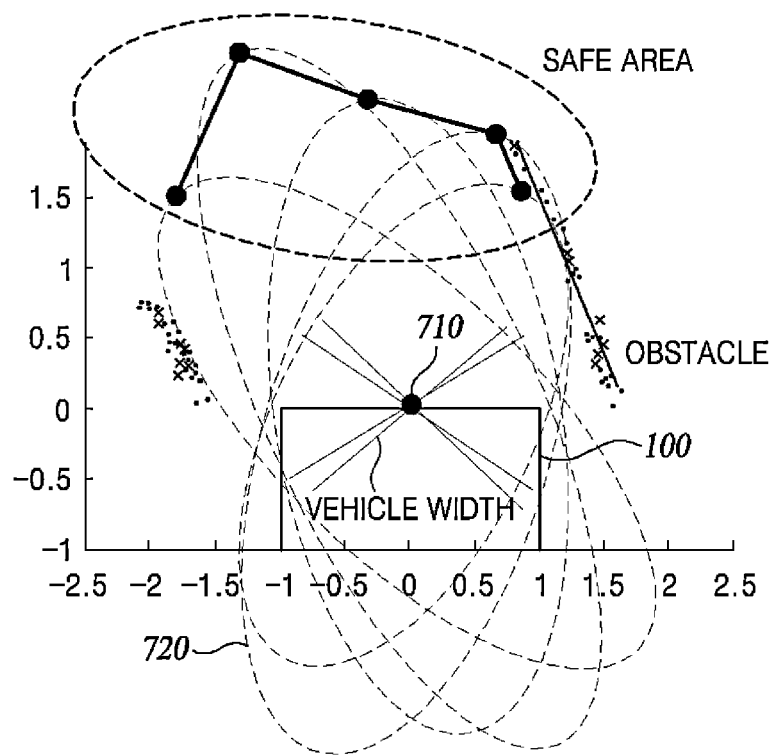
FIGS. 7A and 7B are diagrams illustrating the extraction of a safe area direction vector.
Figure 7B:
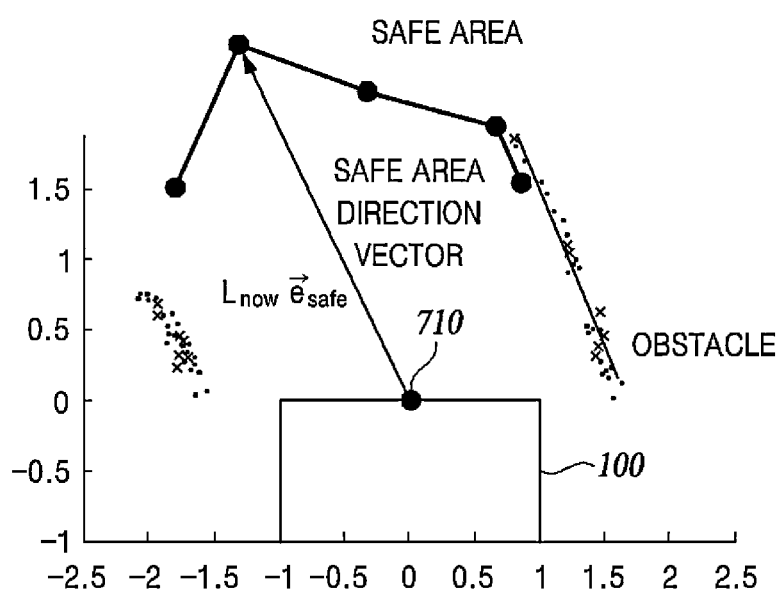

FIGS. 7A and 7B are diagrams illustrating the extraction of the safe-area direction vector.

The safe-area-direction acquisition unit 220 acquires the front area having a predetermined width in a width direction. The safe-area-direction acquisition unit 220 also acquires a length as long as that of an area in contact with an obstacle in a longitudinal direction with respect to a center point 710 on a front end of the vehicle 100. The safe-area-direction acquisition unit 220 also acquires the safe area direction vector heading from the center point 710 on the front end towards the end of the front area.

As shown in FIG. 7A, the front area may be formed using an ellipse having the center point of the front end of the vehicle 100, the predetermined width, and the length of the area as a center, the length of a minor axis, and the length of a major axis, respectively. Here, the predetermined width may be determined as the maximum width of the vehicle 100.

In setting the elliptical front area, the safe-area-direction acquisition unit 220 acquires the front area in a plurality of directions with respect to the front of the vehicle after fixing the length of the minor axis to the width of the vehicle. Here, the plurality of directions means directions of angles sampled at intervals less than 5 degrees within the range of −90 degrees to 90 degrees with respect to the front of the vehicle.

The safe-area-direction acquisition unit 220 generates the safe area direction vector using ellipses generated by rotating through each of the angles sampled in the plurality of directions. In other words, the safe-area-direction acquisition unit 220 generates an ellipse at each sampling angle and acquires an end point of the major axis of the ellipse if the ellipse contacts an obstacle in front of the vehicle 100.

The safe-area-direction acquisition unit 220 fixes the length of the minor axis of the ellipse to the width of the vehicle for one sampling angle, acquires an ellipse 720 when the ellipse contacts an obstacle in front of the vehicle 100 while gradually increasing the length of the major axis of the ellipse from the same length as the length of the minor axis, and defines the acquired ellipse as a first front area. The safe-area-direction acquisition unit 220 acquires the end point of the major axis of the ellipse 720 corresponding to a first front area. Here, the end point of the major axis means the end point of the major axis in front of the vehicle, or the center point of the end. Here, the contact with an obstacle in front of the vehicle 100 means that the elliptical shape does not encroach the shape of the obstacle beyond the boundary of the obstacle.

The safe-area-direction acquisition unit 220 calculates the center point of the end of each respective first front area in the longitudinal direction of each of a plurality of major axes for a plurality of ellipses sampled at sampling angles set at intervals less than 5 degrees within the range of −90 degrees to 90 degrees with respect to the front of the vehicle. The safe-area-direction acquisition unit 220 acquires, as the safe area direction vector, the longest vector among vectors connecting the center point of the front end of the vehicle 100 to the center point of the end of each first front area.

As shown in FIG. 7B, the safe area may be formed by connecting a plurality of major-axis end points acquired according to the plurality of sampling angles. In other words, the safe-area-direction acquisition unit 220 acquires, as the safe area direction vector, the vector connecting the center point 710 of the front end of the vehicle 100 to the farthest major-axis end point, in the safe area of FIG. 7B.

In the above description, it is assumed that an ellipse is used for setting the front area, but the present disclosure is not limited thereto. Various shapes, such as a rectangle, may be used for setting the front area.

The speed control unit 230 determines the speed of the vehicle 100 according to the length of the direction vector in the safe area. Here, as in Equation 1, the speed of the vehicle may be determined according to the ratio of the length of the safe area direction vector to a maximum length of the preset safe area direction vector.

$$v_{now} = \frac{L_{now}}{L_{max}}(v_{max} - v_{offset}) + v_{offset} \qquad \text{Equation (1)}$$

In Equation 1, $v_{now}$ represents the speed of the vehicle 100, $L_{now}$ represents the length of the current safe area direction vector, and $L_{max}$ represents the maximum length of a preset safe area direction vector. For reference, $L_{max}$ may be set to any value set by a user or may be defined as a maximum collision reference margin of a vehicle, which is described below.

In Equation 1, $v_{max}$ represents the maximum speed at which the vehicle may move, and $v_{offset}$ represents the minimum speed of the vehicle when there are adjacent obstacles around the vehicle.

In Equation 1, $v_{max}$ and $v_{offset}$ may each be set to the speed defined in the International Organization for Standardization (ISO) standard autonomous valet parking system (ISO 23374-1).

In the ISO 23374-1 document, an autonomous valet parking vehicle speed including real-time adjustment for handling changing environment and conditions of 3 km/h to 30 km/h is recommended. A list of experimental evaluation criteria with operating performance limited to 3 km/h to 7 km/h in the inter-floor moving section is included.

Therefore, $v_{max}$ which is the maximum speed at which the vehicle is able to move may be set to 7 km/h, and $v_{offset}$ which is the minimum speed of the vehicle when there are adjacent obstacles around the vehicle may be set to 3 km/h. The speeds may vary depending on the embodiment.

On the other hand, $L_{max}$ is defined as the maximum collision margin, as specified in the Enforcement Regulation of the Parking Lot Act, and may depend on the width of the inter-floor connection ramp. In the Enforcement Regulations of the Parking Lot Act, the maximum collision margin, which depends on the width of the inter-floor connection ramp, is specified as a minimum value of 3.3 m.

The movement-direction acquisition unit 240 determines the movement direction of the vehicle according to driving direction information depending on the current steering angle of the vehicle, obstacle information, and a safe area direction vector.

The movement-direction acquisition unit 240 acquires an intersection point at which the uppermost end of the area 410 of interest of the vehicle meets a driving trajectory according to the current steering angle originating from the center point of the front end of the vehicle 100. The movement-direction acquisition unit 240 also acquires a path following vector, which is a vector heading from the center point of the front end of the vehicle 100 towards the intersection point, as driving direction information.

Figure 8:
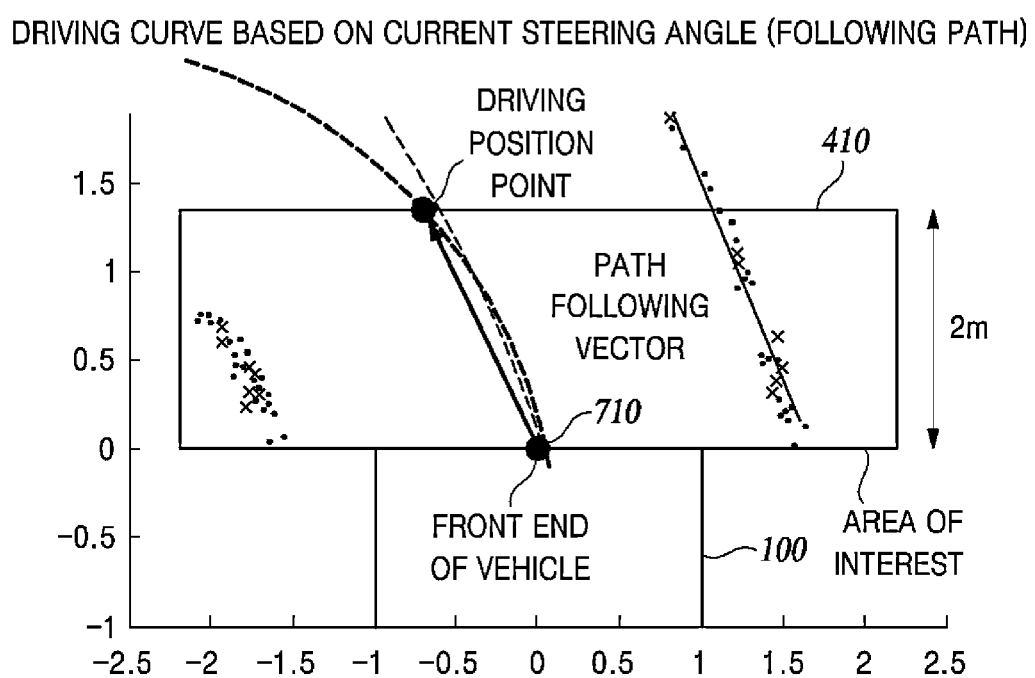
FIG. 8 is a diagram illustrating a method of acquiring a path following vector.

FIG. 8 is a diagram illustrating a method of acquiring the path following vector.

The path following vector is defined as a vector component of the direction in which the vehicle should currently travel.

Since the curvature of the wall is almost constant when moving between floors, the steering angle is not significantly changed. Thus, the driving trajectory to be moved along in the current steering angle state may be replaced with a driving direction that the vehicle should follow. In this case, a point located on the driving trajectory of a point 2 m in front of the vehicle 100 corresponding to the uppermost end of the area of interest is indicated as a driving position point. Also, the path following vector is indicated by a difference between the driving position point and the center on the front end of the vehicle 100.

The movement-direction acquisition unit 240 normalizes each of the obstacle vector, the path following vector, and the safe area direction vector. The movement-direction acquisition unit 240 calculates a vector obtained by giving weights to each of the normalized obstacle vector, path following vector, and safe area direction vector and adding up the vectors as a movement direction vector and acquires the direction of the movement direction vector as the movement direction.

Equation 2 shows an equation for calculating the movement direction vector.

$$e_4(\text{movement direction vector}) = \frac{k_1}{3}e_1 + \frac{k_2}{3}e_2 + \frac{k_3}{3}e_3 \quad \text{Equation (2)}$$

In Equation 2, $e_1$, $e_2$, and $e_3$ are unit vectors corresponding to the obstacle vector, the path following vector, and the safe area direction vector, respectively, and $k_1$, $k_2$ and $k_3$ are weights.

In Equation 2, $k_1$, $k_2$, and $k_3$ may be set such that $0 \leq k_1$, $k_2$, $k_3 \leq 3$, and $k_1+k_2+k_3=3$. However, when the distance between the vehicle 100 and the closest obstacle, i.e., a straight line representation of the closest wall, is equal to or greater than the collision reference margin, the weight of the path following vector may be set high.

Further, the collision reference margin may be determined according to the magnitude of a value at which a distance between the obstacle in the inter-floor connection ramp and the safe area direction vector in the area of interest is minimum.

Figure 9A:
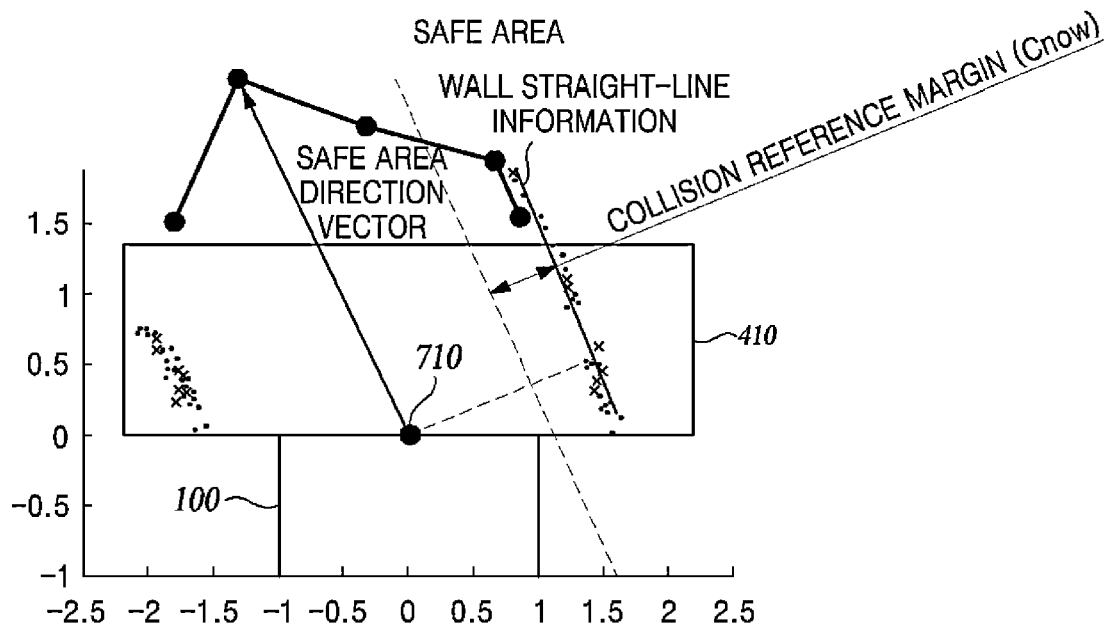
FIG. 9A is a diagram illustrating a collision reference margin.
Figure 9B:
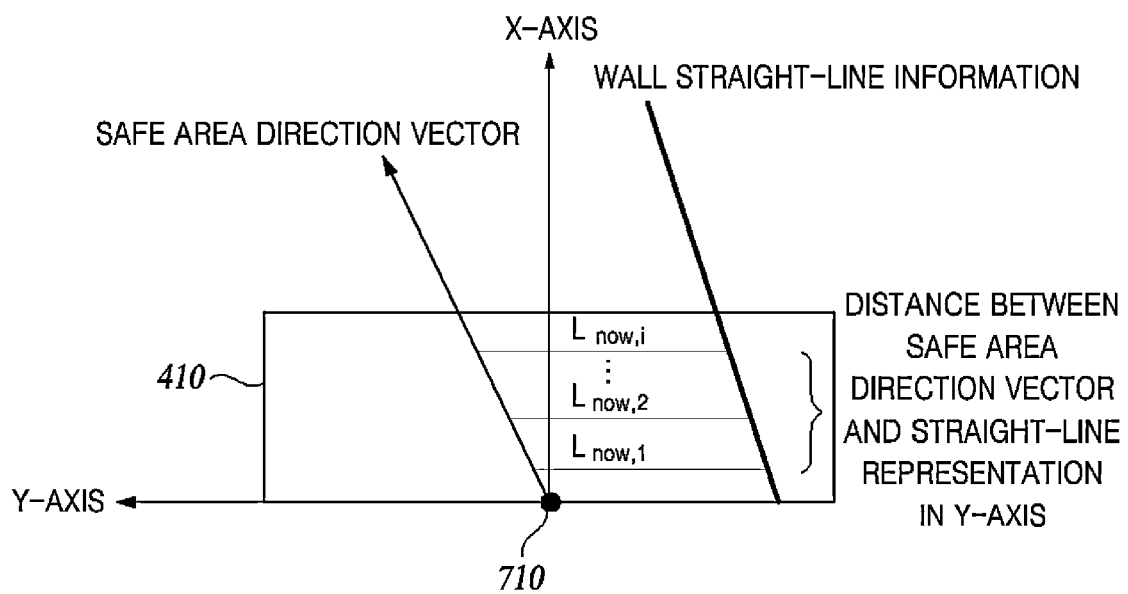
FIG. 9B is a diagram illustrating a method of acquiring the collision reference margin.

FIG. 9A is a diagram illustrating the collision reference margin and FIG. 9B is a diagram illustrating a method of acquiring the collision reference margin.

The movement-direction acquisition unit 240 sets the collision reference margin to determine the weight according to the distance to the obstacle.

As shown in FIG. 9A, the collision reference margin may be defined as a direction perpendicular to the center point 710 of the front end of the vehicle 100 with respect to the wall straight-line representation of the obstacle.

As shown in FIG. 9B, a plurality of lengths $L_{now,1}$, $L_{now,2}$, ..., $L_{now,i}$ between the wall straight-line representation and the safe area direction vector within the area 410 of interest are calculated. Here, the length between the safe area direction vector and the wall straight-line representation means the length of the vehicle 100 in the width direction.

The collision reference margin may be calculated as in Equation 3.

$$c_{now} = 1m \times \frac{\min(L_{now})}{L_{max}} + L_{offset} \quad \text{Equation (3)}$$

$$L_{now} = [L_{now,1}, L_{now,2}, \ldots, L_{now,i}]$$

In Equation 3, $c_{now}$ represents a calculated collision reference margin and $\min(L_{now})$ represents a minimum value among the plurality of lengths $L_{now,1}$, $L_{now,2}$, ..., $L_{now,i}$ between the safe area direction vector and the wall straight-line representation.

Further, as described above, $L_{max}$ may be set to at least a value of 3.3 m as the maximum collision margin, as stipulated in the Enforcement Regulations of the Parking Lot Act. In this case, $\min(L_{now}) \leq L_{max}$.

Further, $L_{offset}$ is the minimum distance for the collision reference margin and is defined as a minimum distance from the wall. In this embodiment, it may be set to a value between 0.3 m and 0.8 m, for example, 0.3 m, but may vary depending on the embodiment.

As shown in Equation 3, the collision reference margin is determined as a value obtained by adding $L_{offset}$ to a value between 0 and 1 m according to the ratio of $L_{max}$ to $L_{now}$.

When a distance between the vehicle 100 and a straight line representation of the closest wall is equal to or greater than the collision reference margin, i.e. when the weight of the path following vector is set high, the values of $k_1$, $k_2$, and $k_3$ may be set. For example, the values may be set as $k_1=k_3=0.5$ and $k_2=2$. A high weight may be given to the component of the path following vector.

In the case that a distance between the vehicle 100 and the straight line representation of the closest wall is equal to or less than the collision reference margin, $k_1=k_2=k_3=1$ may be set.

Figure 10:
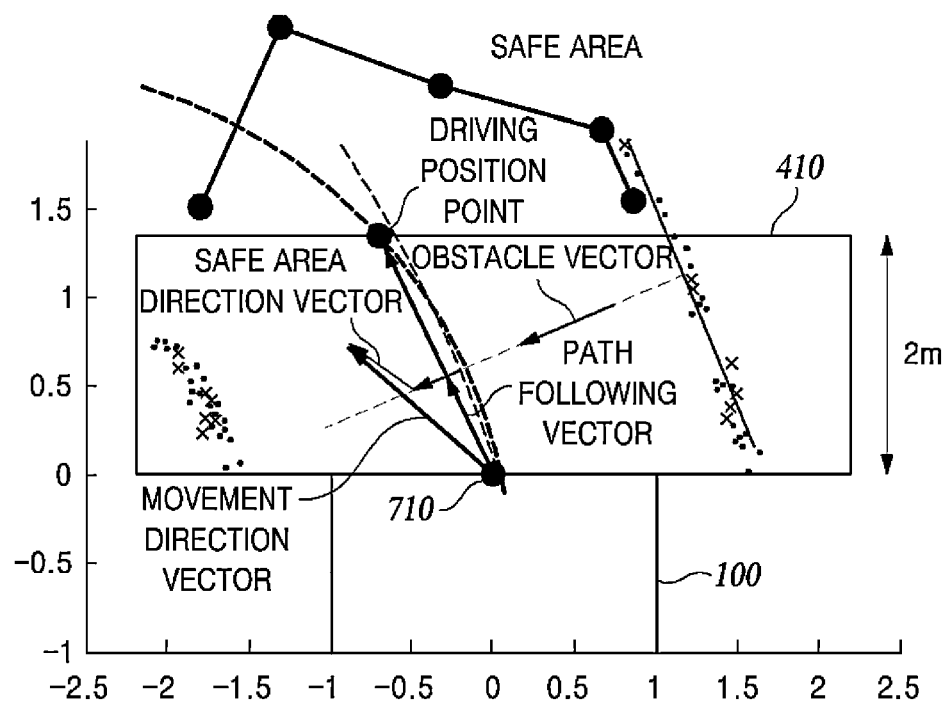
FIG. 10 is a diagram illustrating an example of calculating a movement direction vector.

FIG. 10 is a diagram illustrating an example of calculating the movement direction vector.

As shown in FIG. 10, when the weight of the path following vector is set high, it can be seen that the component of the path following vector is set to be greater than the obstacle vector and the safe area direction vector and that the movement direction vector is calculated.

The steering-angle calculation unit 250 calculates the final steering angle of the vehicle 100, i.e. a target steering angle, based on the movement direction of the movement direction vector and the current steering angle. The steering-angle calculation unit 250 normalizes each of the movement direction vector and the first direction vector corresponding to the current steering angle of the vehicle. The steering-angle calculation unit 250 also calculates the target steering angle using a difference between the normalized movement direction vector and the normalized first direction vector.

The target steering angle may be calculated by Equation 4.

$$P_{steering} = K_p(\Psi_{DES} - \Psi_{NOW}) \quad \text{Equation (4)}$$

In Equation 4, $P_{steering}$ represents the target steering angle, $\Psi DES$ represents the normalized movement direction vector, and $\Psi_{NOW}$ represents the vector normalized as the direction vector corresponding to the current steering angle. Also in Equation 4, $K_p$ is a proportional constant and may be set differently depending on the embodiment.

Figure 11:
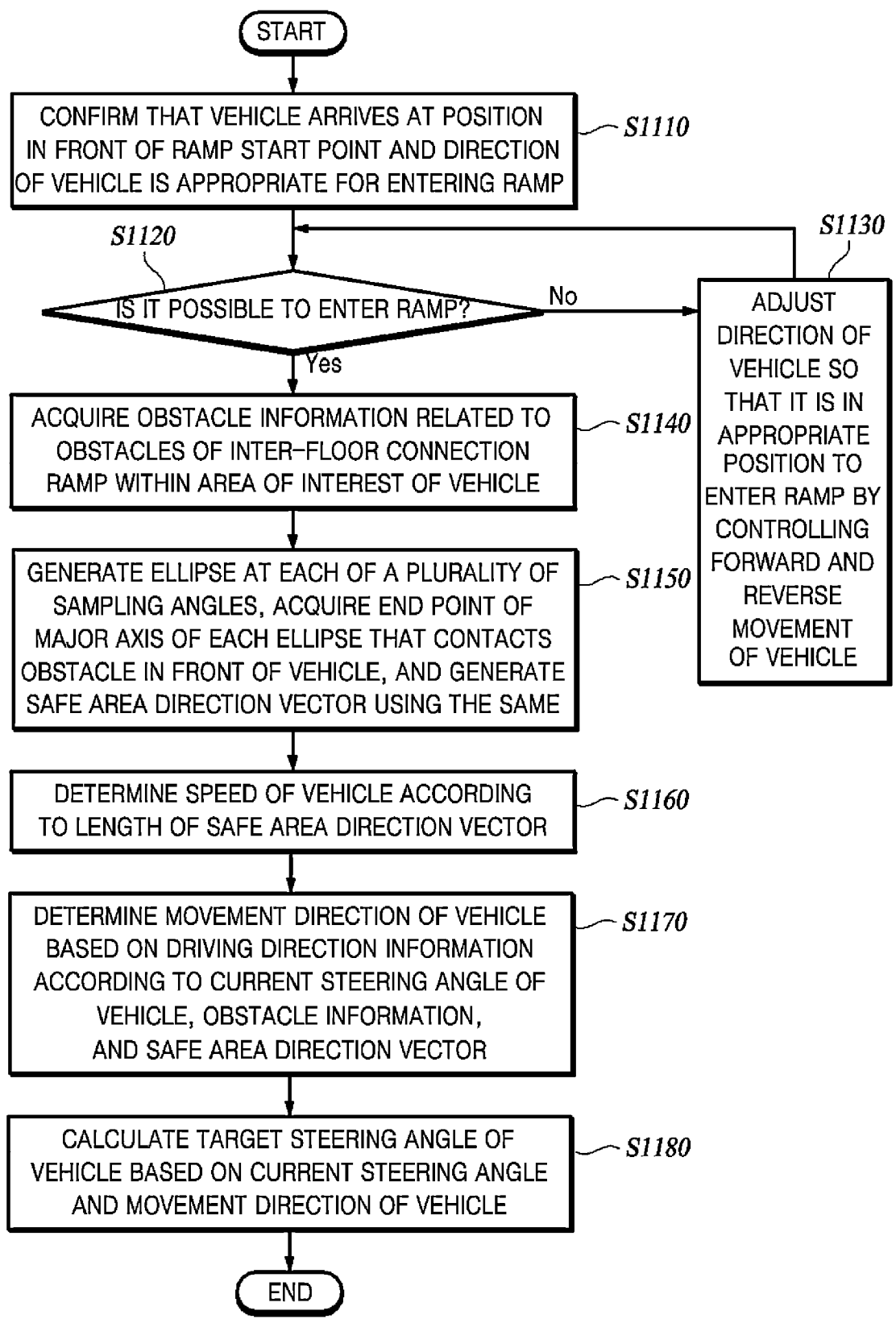
FIG. 11 is a flowchart illustrating a steering control method according to the present disclosure.

FIG. 11 is a flowchart illustrating a steering control method according to the present embodiment.

The steering control method according to this embodiment is described with reference to FIG. 2 and FIG. 11.

It is first confirmed that the vehicle 100 has arrived at a position 320 in front of the ramp start point and the direction of the vehicle 100 is appropriate for entering the ramp (S1110). When confirmed, the obstacle-information acquisition unit 210 checks whether the driving direction of the vehicle 100 has become a direction in which the vehicle can enter the ramp 310 by acquiring left obstacle information and right obstacle information of the entrance to the ramp (S1120).

After the vehicle 100 arrives in front of the ramp start point according to the map information received from the server, when it is determined that the vehicle has arrived at a position at which the driving direction of the vehicle 100 deviates greatly from the entry direction of the ramp 310 (NO in S1120), the obstacle-information acquisition unit 210 adjusts the vehicle 100 by controlling the forward and reverse movement of the vehicle 100 so that it is in an appropriate position to enter the ramp (S1130).

When it is confirmed that the driving direction of the vehicle 100 has become a direction in which the vehicle may enter the ramp 310 (YES in S1120), the obstacle-information acquisition unit 210 acquires obstacle information related to obstacles of the inter-floor connection ramp within the area of interest of the vehicle (S1140). The obstacle-information acquisition unit 210 extracts the closest obstacle among a plurality of obstacles on the wall of the ramp and generates the obstacle vector perpendicular to the straight-line representation of the closest obstacle as the obstacle information.

The safe-area-direction acquisition unit 220 acquires the front area having a predetermined width in the width direction and having a length as long as that of an area in contact with the obstacle in the longitudinal direction with respect to the center point 710 of the front end of the vehicle 100, and acquires the safe area direction vector heading from the center point 710 of the front end toward the end of the front area (S1150).

Here, the front area may be formed using the ellipse having the center point of the front end of the vehicle 100, the predetermined width, and the length of the area as the center, the length of the minor axis, and the length of the major axis, respectively.

Further, the safe-area-direction acquisition unit 220 acquires the front areas using ellipses generated while rotating through directions at angles sampled in the plurality of directions and generates the safe area direction vector from the plurality of the acquired front areas. In other words, the safe-area-direction acquisition unit 220 generates an ellipse at each sampling angle, acquires an end point of the major axis of the ellipse if the ellipse contacts the obstacle in front of the vehicle 100, and generates the safe area direction vector using the end point.

The speed control unit 230 determines the speed of the vehicle 100 according to the length of the safe area direction vector (S1160).

The movement-direction acquisition unit 240 determines the movement direction of the vehicle based on the safe area direction vector, the obstacle information, and the driving direction information according to the current steering angle of the vehicle (S1170).

The steering-angle calculation unit 250 calculates the target steering angle of the vehicle based on the movement direction and the current steering angle of the vehicle (S1180).

Meanwhile, various functions or methods described in the present disclosure may be implemented as instructions stored in a non-transitory recording medium which may be read and executed by one or more processors. The non-transitory recording medium includes, for example, all types of recording devices in which data is stored in a form readable by a computer system. For example, the non-transitory recording medium includes a storage medium such as an erasable programmable read only memory (EPROM), a flash drive, an optical drive, a magnetic hard drive, and a solid state drive (SSD).

In the above description, it should be understood that the described embodiments may be implemented in many different ways. Functions described in one or more examples may be implemented in hardware, software, firmware, or any combination thereof. It should be understood that functional components described in this specification have been labeled as "unit" to particularly emphasize their implementation independence.

Although embodiments of the present disclosure have been described for illustrative purposes, those of ordinary skill in the art should appreciate that various modifications, additions, and substitutions are possible, without departing from the idea and scope of the appended claims. Therefore, embodiments of the present disclosure have been described for the sake of brevity and clarity. The scope of the technical idea of the present embodiments is not limited by the illustrations. Accordingly, one of ordinary skill would understand that the scope of the appended claims is not to be limited by the above explicitly described embodiments but by the claims and equivalents thereof.

What is claimed is:

1. An apparatus for calculating a steering angle for inter-floor travel of an autonomous vehicle, the apparatus comprising:
   an obstacle-information acquisition unit configured to extract obstacle information related to obstacles of an inter-floor connection ramp from an image captured of an area of interest in front of the vehicle and to obtain an obstacle vector;
   a safe-area-direction acquisition unit configured to obtain a plurality of safe areas based on information of the vehicle and the obstacle information, and to obtain a safe area direction vector based on a center point of a front end of the vehicle and the plurality of safe areas;

a movement-direction acquisition unit configured to determine a movement direction of the vehicle based on the safe area direction vector, the obstacle vector, and driving direction information according to a current steering angle of the vehicle; and a steering angle calculation unit configured to calculate a target steering angle of the vehicle based on the movement direction and the current steering angle.

2. The apparatus of claim 1, wherein the obstacle-information acquisition unit is configured to extract straight-line information of at least one obstacle from the image and to obtain, as the obstacle vector, a vector perpendicular to a straight-line representation of an obstacle closest to the vehicle.

3. The apparatus of claim 1, wherein each of the plurality of safe areas is configured to have an area formed of an ellipse in contact with the obstacle among ellipses centered at the center point of the front end of the vehicle.

4. The apparatus of claim 1, wherein the safe-area-direction acquisition unit is configured to calculate an end point having a distance farthest from the center point of the front end of the vehicle and located in front of the vehicle within the plurality of safe areas and to obtain a vector heading towards the end point from the center point of the front end of the vehicle as the safe area direction vector.

5. The apparatus of claim 1, wherein the movement-direction acquisition unit is configured to calculate a driving trajectory according to the current steering angle, to determine, as a driving position point, a point on the driving trajectory located at a predetermined distance in front of the center point of the front end of the vehicle, and to obtain a path-following vector heading towards the driving position point from the center point of the front end of the vehicle as the driving direction information.

6. The apparatus of claim 5, wherein the movement-direction acquisition unit is configured to normalize each of the safe area direction vector, the path-following vector, and the obstacle vector, to obtain a weighted sum of the normalized obstacle vector, the normalized path-following vector, and the normalized safe area direction vector, and to obtain a direction of the weighted sum as the movement direction.

7. The apparatus of claim 6, wherein the movement-direction acquisition unit is configured to set a weight of the path-following vector high when a distance between an obstacle closest to the vehicle and the vehicle is greater than a collision reference margin.

8. The apparatus of claim 7, wherein the collision reference margin is determined according to a minimum distance between a straight-line representation of the obstacle closest to the vehicle and the safe area direction vector.

9. The apparatus of claim 1, further comprising:
a speed control unit configured to determine a speed of the vehicle according to a length of the safe area direction vector.

10. The apparatus of claim 9, wherein the speed of the vehicle is determined according to a ratio of the length of the safe area direction vector to a predetermined maximum length of the safe area direction vector.

11. A method of calculating a steering angle for inter-floor travel of an autonomous vehicle, the method comprising:
extracting obstacle information related to obstacles of an inter-floor connection ramp from an image captured of an area of interest in front of the vehicle and obtaining an obstacle vector;

obtaining a plurality of safe areas based on information of the vehicle and the obstacle information and obtaining a safe area direction vector based on a center point of a front end of the vehicle and the plurality of safe areas;

determining a movement direction of the vehicle based on the safe area vector, the obstacle vector, and driving direction information according to a current steering angle of the vehicle; and calculating a target steering angle of the vehicle based on the movement direction and the current steering angle.

* * * * *